June 17, 1930.  B. F. TALLEY  1,764,812
DISK SHARPENER
Filed Jan. 6, 1927  2 Sheets-Sheet 1
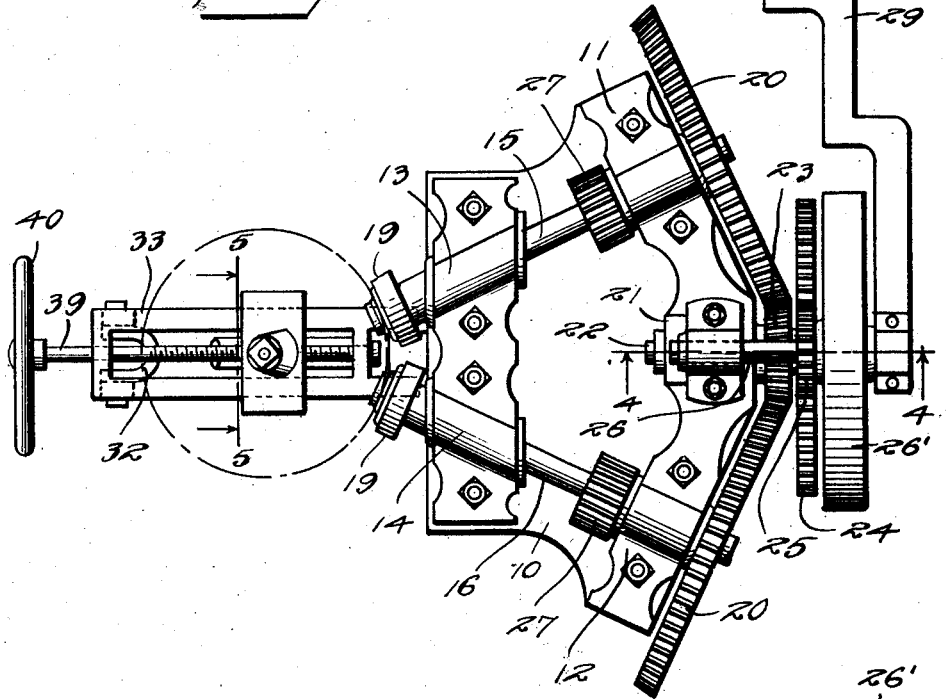
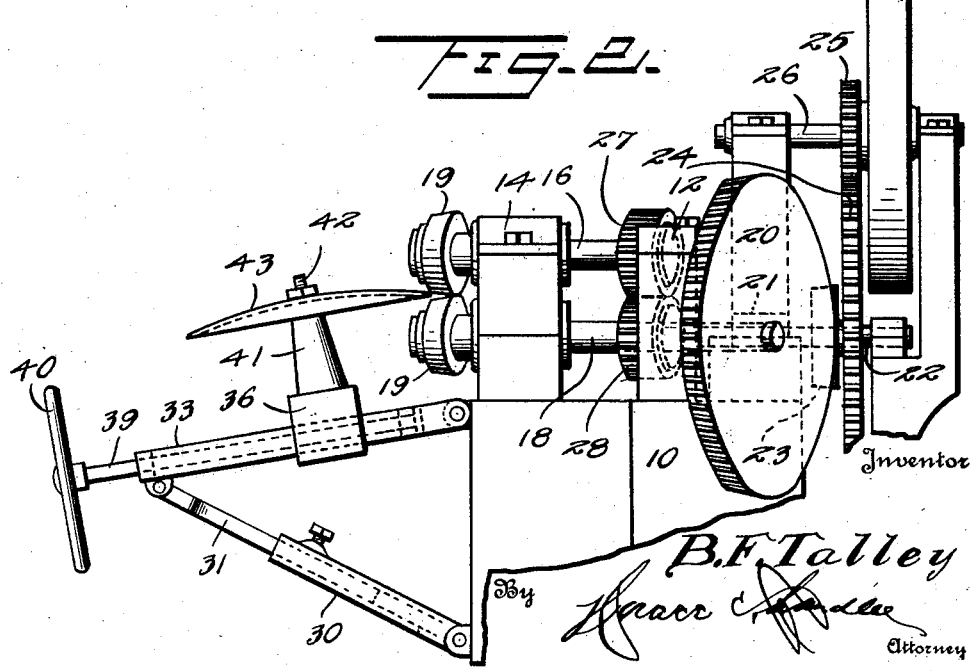
Inventor
B. F. Talley
By
Attorney June 17, 1930.                B. F. TALLEY                1,764,812
                              DISK SHARPENER
                            Filed Jan. 6, 1927            2 Sheets-Sheet 2
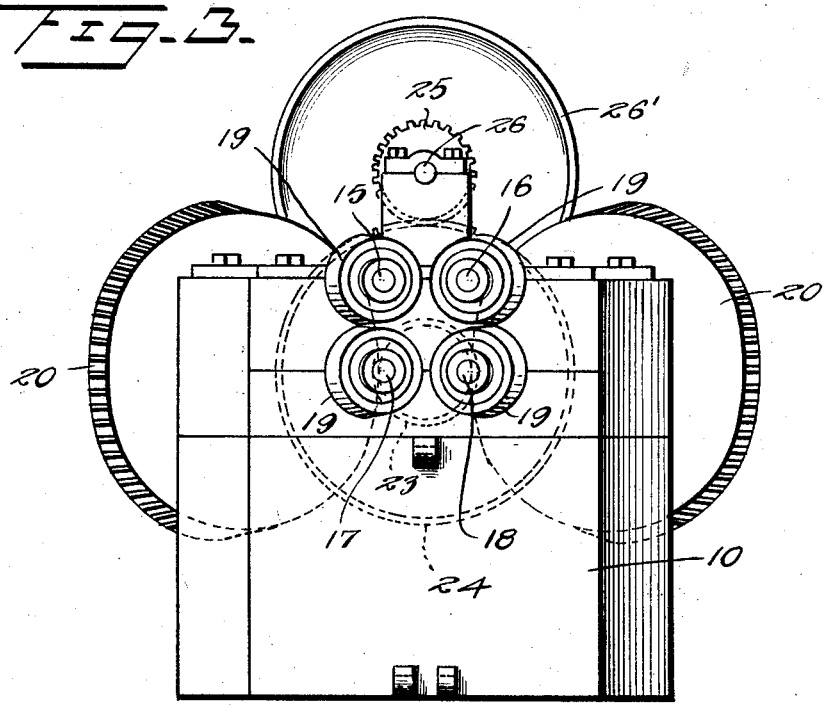
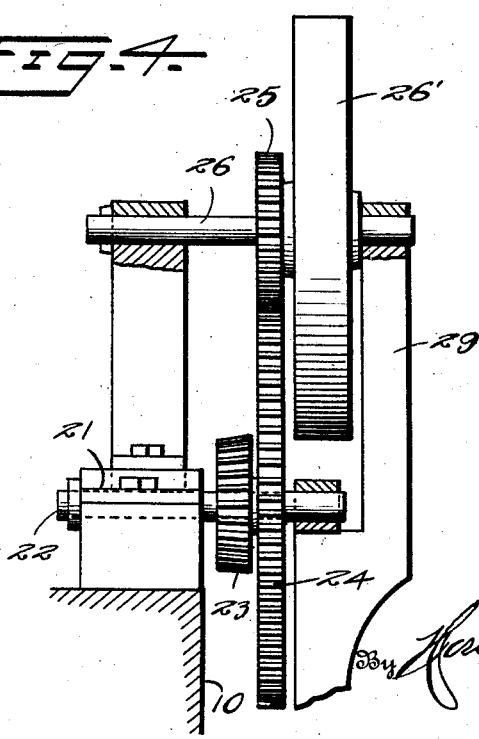
Inventor
B. F. Talley
By
Attorney Patented June 17, 1930

1,764,812

UNITED STATES PATENT OFFICE

BENJAMIN F. TALLEY, OF DRUMMOND, OKLAHOMA, ASSIGNOR OF ONE-HALF TO SCOVIL SWART, OF DRUMMOND, OKLAHOMA

DISK SHARPENER

Application filed January 6, 1927. Serial No. 159,443.

This invention relates to new and useful improvements in sharpening devices, and particularly to devices, or machines, for sharpening the peripheral edges of disks, such as are used in agricultural machines.

One object of the invention is to provide a machine of this character which is simple in construction, and which is durable and efficient in operation.

Another object is to provide a machine of this character which will roll out the peripheral edge portion of a disk without producing a "wavy" formation therein.

Another object is to provide a device of this character having novel means for feeding the disk to the rolls.

A further object is to provide means whereby to accommodate disks of different diameters.

Other objects and advantages will be apparent from the following description when taken in connection with the accompanying drawings.

In the drawings:

Figure 1 is a top plan view of a disk sharpening machine made in accordance with the present invention.

Figure 2 is a side elevation of the same.

Figure 3 is a front elevation.

Figure 4 is a vertical sectional view on the line 4—4 of Figure 1.

Figure 5 is a transverse sectional detail view on the line 5—5 of Figure 1.

Referring particularly to the accompanying drawings, 10 represents a suitable frame on which are mounted the lower rear bearings 11 and the upper rear bearings 12, and the lower forward bearings 12, and upper forward bearings 14. Upon reference to the plan view, Fig. 1, it will be seen that the bearings 12 are in alinement with the lower bearings 14, but that imaginary lines drawn through such bearings converge toward the front of the machine. Similarly the lower bearings 11 are in converging alinement with the bearings 13. Mounted in the alined bearings 11 and 13 are the shaft 15, and similarly mounted in the alined bearings 12 and 14, are the shafts 16. The shafts 15, as shown in the drawings, are mounted in the lower bearings 11 and 13, and similarly mounted in the upper bearings 12 and 14, are the shafts 16. Each of the four shafts projects a short distance beyond the front of the machine frame, and has mounted thereon the pressing roll 19. On the rear end of each of the shafts 15 and 16 is fixed a large bevel gear 20. Between the lower bearings 11 is a bearing 21, in which is mounted a shaft 22, said shaft carrying a small bevel gear meshing simultaneously with the large gears 20. Also carried by the shaft 22 is a large gear 24, which meshes with a gear 25, on the shaft 26, mounted above the shaft 22. The shaft 26 receives power from any suitable source, through the medium of the pulley 26'. On each of the shafts 15 and 16, between the alined bearings, in which said shafts are mounted, is a plain gear 27, which meshes with a similar gear 28, on the shaft 17 or 18, thereabove, and whereby the shafts 15 and 17 are arranged to turn together. A bracket arm 29 is fixed at one end to the frame, and with its other end supporting the other end of the shaft 26.

Pivotally mounted on the front of the frame of the machine, below the rolls 19, is an upwardly extending tubular member 30, and slidably adjustable in said member is a rod 31, having its upper end forked, as shown at 32. Pivotally connected to the forked end of the rod 31, and extending transversely of the machine, is a frame 33. Formed vertically in the intermediate portion of the frame 33 is a longitudinal slot 34, and slidable in the slot is the intermediate portion 35, of a block 36. This block has the grooves 37 in its lower side receiving the portions of the frame 33, at opposite sides of the slot 34. In said intermediate portion 35 is formed a threaded opening 38. Threaded through said opening 38 is an operating shaft 39, the inner end of which is swiveled in the frame 33, while the outer end is provided with a hand-wheel 40. Formed on the upper face of the intermediate portion of the block 36 is a tapering lug 41, said lug inclining upwardly and inwardly toward the machine frame, and being provided with a terminal spindle 42, on which is adapted to be supported the disk 43, which is to be sharpened by the rolls 19.

It will be noted that the hand-wheel 40 is disposed at a proper distance beyond the outer peripheral portion of the disk 43, whereby such disk will not interfere with the proper operation of the hand wheel, to move the block 36, and disk, toward and away from the rolls 19.

Attention is particularly directed to the fact that the sets of rolls, each comprising upper and lower rolls, hold or grip the edge of the disk at two spaced points.

What is claimed is:

A disk sharpener including a base, pairs of shafts supported on the base in superimposed planes, the pairs of shafts converging in a common direction with a shaft of each pair being in vertical alinement with a corresponding shaft of the other pair, gears on the shafts, pressing rolls on all of the shafts constituting two sets of vertically alined rolls, the gears on said shafts arranged in such relation that the gear of each upper shaft meshes with the gear of a corresponding lower shaft, means mounted on the base for supporting a disk with its cutting edge between said sets of rolls, one pair of said vertically alined rolls being spaced from the other vertically alined pair for gripping the periphery of a disk at spaced points, and driving means engaged with said shafts.

In testimony whereof, I affix my signature.

BENJAMIN F. TALLEY.